(12) United States Patent
Nishiu

(10) Patent No.: US 11,981,322 B2
(45) Date of Patent: May 14, 2024

(54) CONTROL DEVICE FOR VEHICLE DRIVE DEVICE

(71) Applicant: AISIN CORPORATION, Aichi (JP)

(72) Inventor: Masahiro Nishiu, Kariya (JP)

(73) Assignee: AISIN CORPORATION, Aichi (JP)

( * ) Notice: Subject to any disclaimer, the term of this patent is extended or adjusted under 35 U.S.C. 154(b) by 529 days.

(21) Appl. No.: 17/413,015

(22) PCT Filed: Feb. 4, 2020

(86) PCT No.: PCT/JP2020/004139
§ 371 (c)(1),
(2) Date: Jun. 11, 2021

(87) PCT Pub. No.: WO2020/162457
PCT Pub. Date: Aug. 13, 2020

(65) Prior Publication Data
US 2022/0063596 A1    Mar. 3, 2022

(30) Foreign Application Priority Data

Feb. 6, 2019   (JP) ................................. 2019-019859

(51) Int. Cl.
*B60W 20/50* (2016.01)
*B60K 6/48* (2007.10)
(Continued)

(52) U.S. Cl.
CPC ............ *B60W 20/50* (2013.01); *B60W 10/02* (2013.01); *B60W 10/06* (2013.01); *B60W 10/08* (2013.01);
(Continued)

(58) Field of Classification Search
CPC ...... B60W 20/50; B60W 10/02; B60W 10/06; B60W 10/08; B60W 2510/0241;
(Continued)

(56) References Cited

U.S. PATENT DOCUMENTS 8,303,463 B2 * 11/2012 Sah ..................... F16H 61/0206
477/158
2007/0221467 A1 * 9/2007 Stevenson ........... F16D 48/0206
192/48.601
(Continued)

FOREIGN PATENT DOCUMENTS

EP         1116620 A2 *  7/2001  ............. B60K 6/365
JP     2001032916 A  *  2/2001  ............. B60K 6/405
(Continued)

OTHER PUBLICATIONS

Translated international search report (Year: 2023).*
Written Opinion for PCT/JP2020/004139 dated Apr. 21, 2019.
International Search Report for PCT/JP2020/004139 dated Apr. 21, 2019.

*Primary Examiner* — James A Shriver, II
*Assistant Examiner* — Ian Bryce Shelton
(74) *Attorney, Agent, or Firm* — Sughrue Mion, PLLC

(57) ABSTRACT

A vehicle drive device including an engagement pressure flow channel, a lubrication flow channel, a first pump having a discharge port connected to the engagement pressure flow channel, a second pump, and a flow channel control valve. The flow channel control valve selectively switches flow channels between a first state in which an outflow destination of oil discharged from the second pump is the engagement pressure flow channel and a second state in which the outflow destination is the lubrication flow channel. When a failure in which the flow channel control valve is fixed in the second state has occurred, a control device for a vehicle control device performs fail-safe control in which a rotational speed of at least one of an internal combustion engine and a rotating electrical machine is increased to supply oil to the engagement pressure flow channel by the first pump.

20 Claims, 5 Drawing Sheets

(51) Int. Cl.
*B60W 10/02* (2006.01)
*B60W 10/06* (2006.01)
*B60W 10/08* (2006.01)
*F16D 25/12* (2006.01)
*F16D 48/06* (2006.01)

(52) U.S. Cl.
CPC .......... *F16D 25/12* (2013.01); *F16D 48/066* (2013.01); *B60K 6/48* (2013.01); *B60W 2510/0241* (2013.01); *B60W 2710/0644* (2013.01); *F16D 2500/1026* (2013.01); *F16D 2500/30406* (2013.01); *F16D 2500/501* (2013.01)

(58) Field of Classification Search
CPC ... B60W 2710/0644; B60W 2710/021; B60W 2710/081; B60W 2710/1005; B60W 10/10; B60W 10/101; B60W 10/108; B60W 10/11; B60W 10/30; F16D 25/12; F16D 48/066; F16D 2500/1026; F16D 2500/30406; F16D 2500/501; F16D 2048/0236; F16D 2048/0266; F16D 48/02; B60K 6/48; B60K 2006/4825; B60K 6/387; B60K 6/547; B60Y 2400/4045; F16H 2059/366; F16H 2059/465; F16H 2061/0037; F16H 2061/1224; F16H 61/0021; F16H 61/0031; F16H 61/12; F16H 63/50
See application file for complete search history.

(56) References Cited

U.S. PATENT DOCUMENTS

| | | | | |
|---|---|---|---|---|
| 2009/0111643 | A1* | 4/2009 | Sah | F16D 48/066 |
| | | | | 180/65.7 |
| 2009/0111644 | A1* | 4/2009 | Kaminsky | B60W 20/40 |
| | | | | 180/65.7 |
| 2009/0115365 | A1* | 5/2009 | Heap | B60K 6/547 |
| | | | | 318/434 |
| 2012/0199437 | A1* | 8/2012 | Okuda | F16D 48/04 |
| | | | | 192/85.63 |
| 2012/0247106 | A1* | 10/2012 | Noda | B60L 15/2054 |
| | | | | 60/714 |
| 2013/0157806 | A1* | 6/2013 | Koyama | B60W 30/19 |
| | | | | 903/902 |
| 2013/0211654 | A1* | 8/2013 | Tanisshima | B60K 6/547 |
| | | | | 180/65.265 |
| 2018/0163859 | A1* | 6/2018 | Kobayashi | B60W 20/30 |
| 2020/0131955 | A1* | 4/2020 | Okuda | F01M 1/16 |

FOREIGN PATENT DOCUMENTS

| | | | |
|---|---|---|---|
| JP | 2013213557 | A * | 10/2013 |
| JP | 2014052034 | A * | 3/2014 |
| JP | 2014234093 | A * | 12/2014 |
| JP | 2015-197146 | A | 11/2015 |
| JP | 2015197146 | A * | 11/2015 |

* cited by examiner

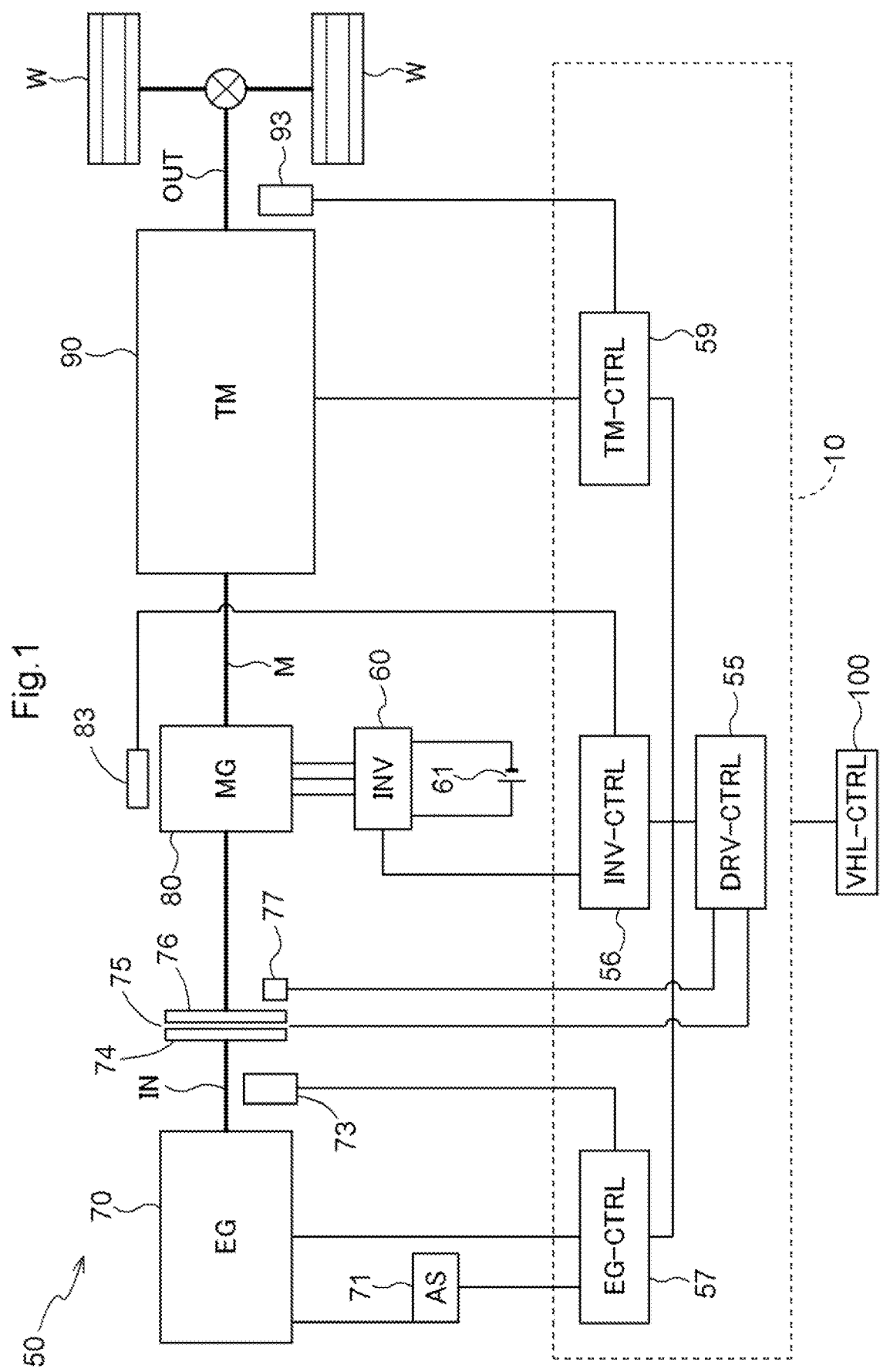

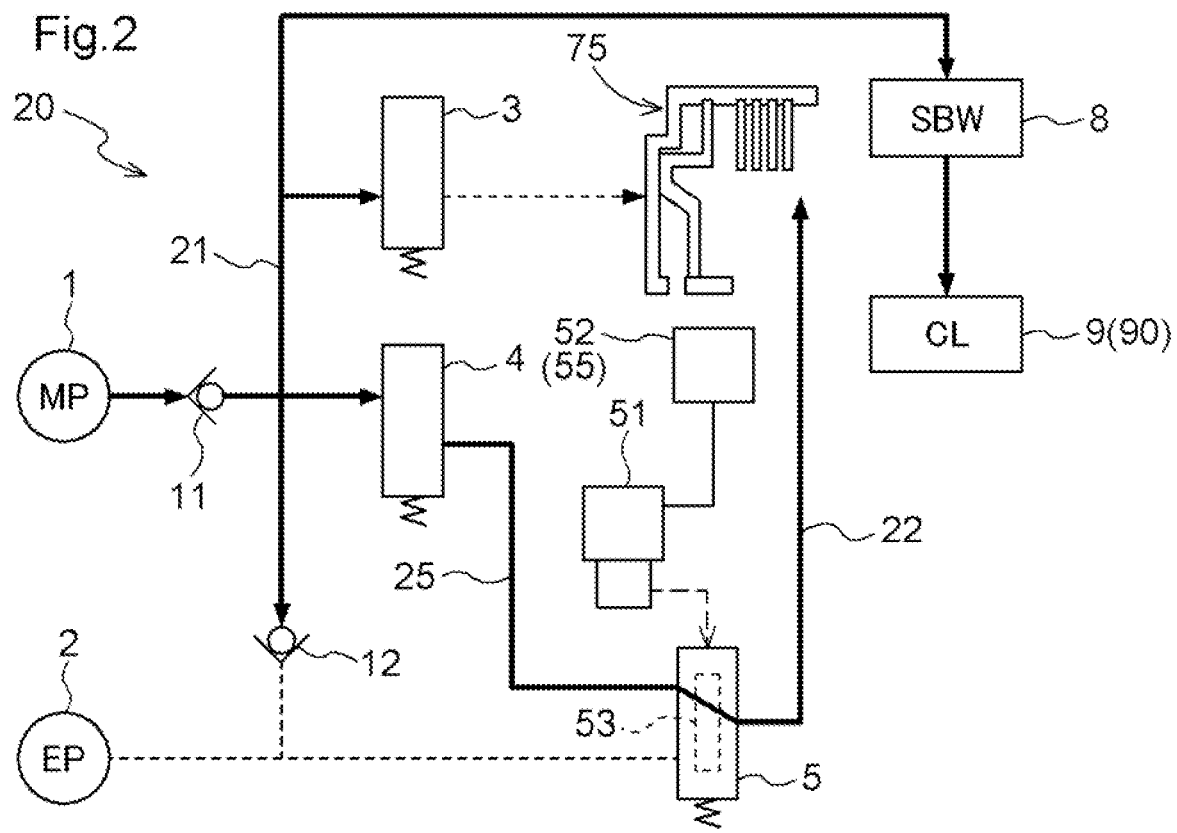
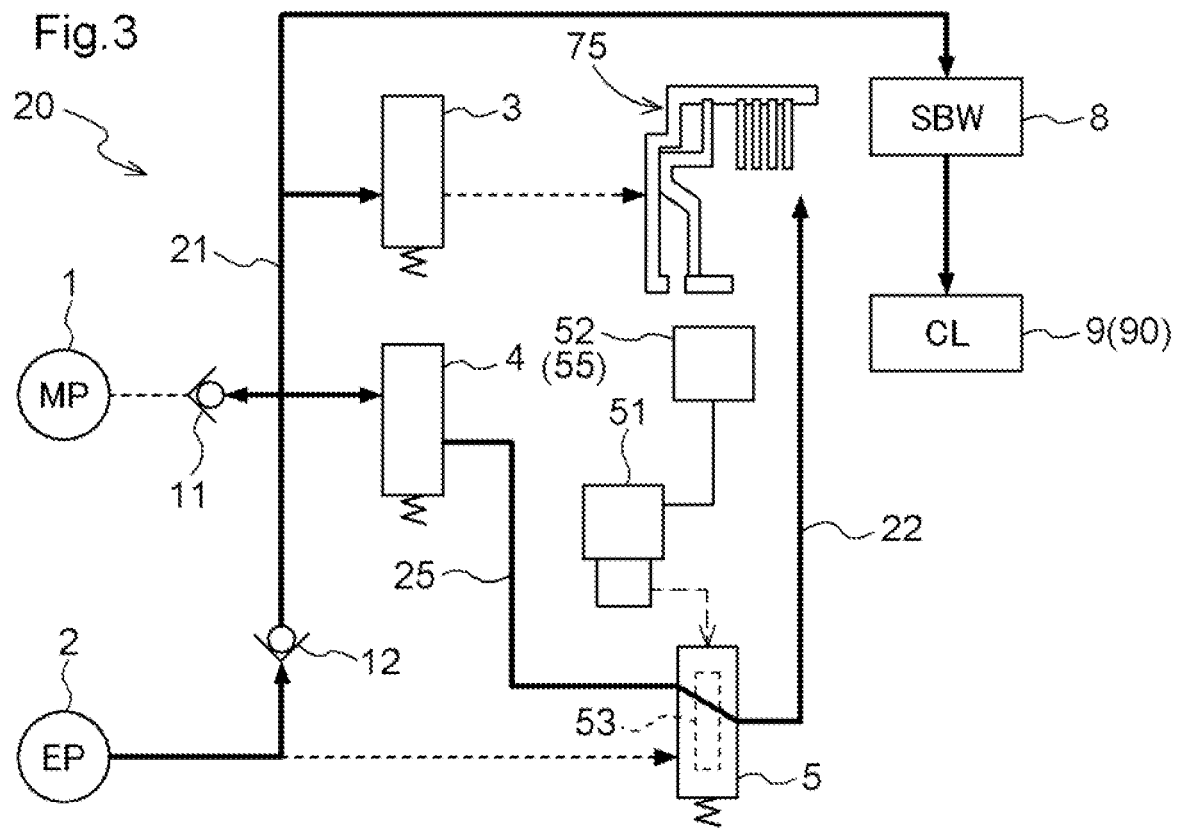

CONTROL DEVICE FOR VEHICLE DRIVE DEVICE

CROSS REFERENCE TO RELATED APPLICATIONS

This application is a National Stage of International Application No. PCT/JP2020/04139 filed Feb. 4, 2020, claiming priority based on Japanese Patent Application No. 2019-019859 filed Feb. 6, 2019, the contents of which are incorporated in their entirety.

TECHNICAL FIELD

The present disclosure relates to a control device for a vehicle drive device whose control target is a vehicle drive device including an internal combustion engine and a rotating electrical machine as drive power sources of wheels.

BACKGROUND ART

JP 2015-197146 A discloses an example of a hydraulic circuit in a vehicle drive device including an internal combustion engine and a rotating electrical machine as drive power sources of wheels, the hydraulic circuit supplying oil for engagement control to engagement devices included in the vehicle drive device and supplying oil for lubrication to the vehicle drive device (reference signs in parentheses in the Background Art below are those in literature referred to.). The hydraulic circuit includes a mechanical oil pump (34) and a motor-driven oil pump (35).
Valves (48 and 49) are provided on an output side of the motor-driven oil pump (35). The first valve (48) switches between a state in which the lubrication and cooling of a brake (B2) are performed using oil with a relatively high flow rate and a state in which the lubrication and cooling of the brake (B2) are performed using oil with a low flow rate. The second valve (49) switches between a state in which the lubrication and cooling of an inner friction plate (19) and an outer friction plate (20) of a clutch (K0) are performed using oil with a relatively high flow rate and a state in which the lubrication and cooling of the inner friction plate (19) and the outer friction plate (20) of the clutch (K0) are performed using oil with a low flow rate.

CITATIONS LIST

Patent Literature

Patent Literature 1: JP 2015-197146 A
In the above-described hydraulic circuit, oil for engagement control for the engagement devices included in the vehicle drive device is supplied by the mechanical oil pump (34), and oil for lubrication for the vehicle drive device is supplied by the motor-driven oil pump (35). The valves (48 and 49) are controlled to switch between a state in which lubrication and cooling are performed using oil with a relatively high flow rate and a state in which lubrication and cooling are performed using oil with a low flow rate. Here, taking into account, for example, the start of a vehicle from a stopped state, it is desirable that oil for engagement control be able to be supplied using oil discharged from the motor-driven oil pump (34). The above-described hydraulic circuit has a structure in which the output side of the motor-driven oil pump (34) is connected through a check valve (58) to an oil passage for engagement control, and when the mechanical oil pump (34) does not operate, the check valve (58) goes into an open state, and oil for engagement control can be supplied by the motor-driven oil pump (35). However, the literature does not show a structure in which oil for engagement control can be more efficiently supplied from the motor-driven oil pump (35), e.g., a structure in which a valve switches flow channels so as to connect oil from the motor-driven oil pump (35) to the oil passage for engagement control instead of an oil passage for lubrication and cooling.

Note, however, that even when a valve is included that can thus switch a flow channel of oil discharged from the motor-driven oil pump (35) to the oil passage for lubrication and cooling or the oil passage for engagement control, if a failure or the like occurs in the valve, then the flow channel of oil discharged from the motor-driven oil pump (35) may be fixed to an "oil passage for lubrication and cooling" side. In such a case, there is a possibility that trouble may occur in engagement of the engagement devices, hindering vehicle's appropriate travel including a start.

SUMMARY OF THE DISCLOSURE

Technical Problems

Hence, provision of a technique is desired in which there is included a flow channel control valve that can switch a destination of oil discharged from a pump driven by a power source different from drive power sources of wheels to an oil passage for lubrication and cooling or an oil passage for engagement control, and even when a failure has occurred in which the flow channel control valve is fixed to a side where the oil passage for lubrication and cooling is connected to the pump, oil is appropriately supplied to the oil passage for engagement control.

Solutions to Problems

In one aspect, a control device for a vehicle drive device that takes into account the above description is a control device for a vehicle drive device whose control target is a vehicle drive device including an internal combustion engine and a rotating electrical machine as drive power sources of wheels, and having a drive power source engagement device, the rotating electrical machine, and a transmission device disposed from an input member side in a power transfer path connecting an input member drive-coupled to the internal combustion engine to an output member drive-coupled to the wheels, and the vehicle drive device includes: an engagement pressure flow channel that supplies oil for engagement control to the drive power source engagement device and a transmission engagement device included in the transmission device; a lubrication flow channel that supplies oil for lubrication to the drive power source engagement device; a first pump driven by at least one of the internal combustion engine and the rotating electrical machine and having a discharge port connected to the engagement pressure flow channel; a second pump driven by a power source different from the internal combustion engine and the rotating electrical machine; and a flow channel control valve that selectively switches flow channels between a first state in which an outflow destination of oil discharged from the second pump is the engagement pressure flow channel and a second state in which an outflow destination of oil discharged from the second pump is the lubrication flow channel, and when a failure in which the flow channel control valve is fixed in the second state has occurred, fail-safe control is performed in which a rotational speed of at least one of the internal combustion engine and the rotating electrical machine is increased to supply oil to the engagement pressure flow channel by the first pump, by which the drive power source engagement device and the transmission engagement device are controlled.

When a failure in which the flow channel control valve is fixed in the second state has occurred, the outflow destination of oil discharged from the second pump is fixed to the lubrication flow channel. Here, for example, when the discharge pressure of the first pump is insufficient, sufficient oil is not supplied to the engagement pressure flow channel. According to this configuration, when a failure in which the flow channel control valve is fixed in the second state has occurred, by performing fail-safe control to increase the rotational speed of at least one of the internal combustion engine and the rotating electrical machine which are power sources that drive the first pump, the discharge pressure of the first pump can be increased. Namely, even when oil cannot be supplied to the engagement pressure flow channel from the second pump, oil is supplied to the engagement pressure flow channel by the first pump, by which the drive power source engagement device and the transmission engagement device can be controlled. As such, according to this configuration, there is included a flow channel control valve that can switch the destination of oil discharged from a pump driven by a power source different from the drive power sources of the wheels to an oil passage for lubrication and cooling or an oil passage for engagement control, and even when a failure has occurred in which the flow channel control valve is fixed to a side where the oil passage for lubrication and cooling is connected to the pump, oil can be appropriately supplied to the oil passage for engagement control.

Further features and advantages of the control device for a vehicle drive device will become apparent from the following description of an embodiment which will be described with reference to drawings.

BRIEF DESCRIPTION OF DRAWINGS

FIG. 1 is a schematic block diagram of a vehicle drive device and a drive control device.

FIG. 2 is a hydraulic circuit diagram showing an example of a low lubrication mode using a first pump.

FIG. 3 is a hydraulic circuit diagram showing an example of a low lubrication mode using a second pump.

DESCRIPTION OF EMBODIMENTS

Figure 4:
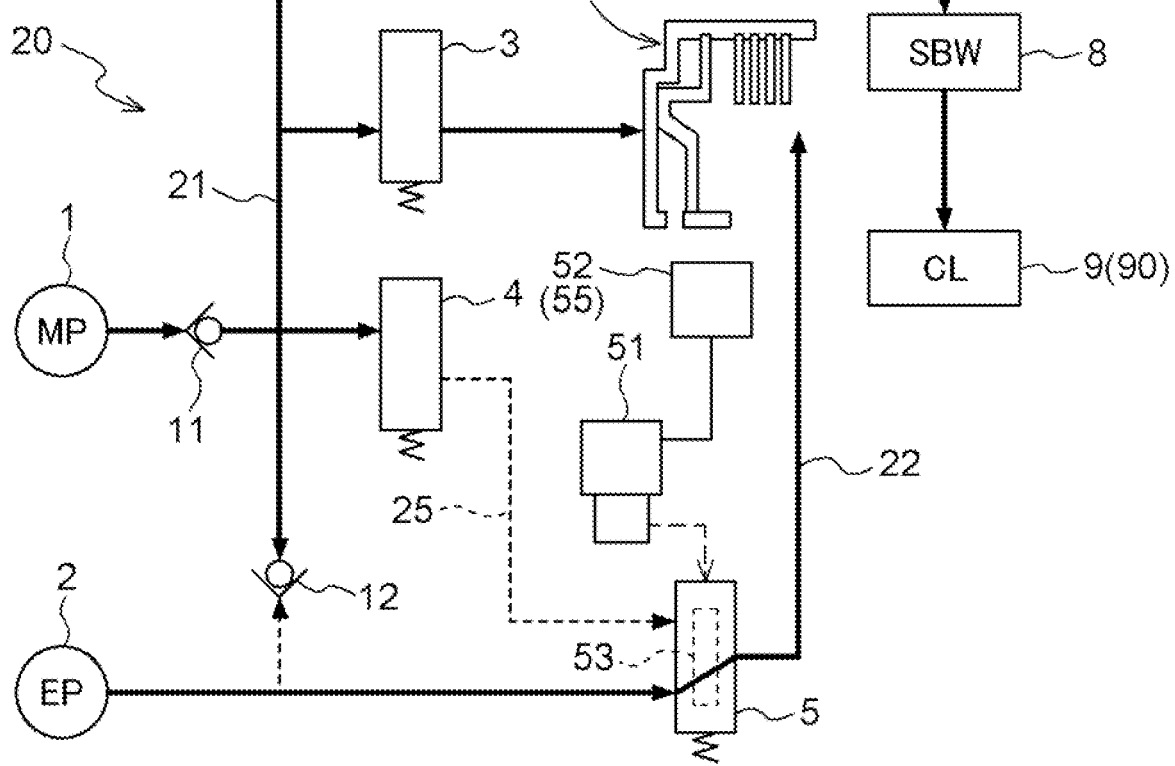
FIG. 4 is a hydraulic circuit diagram showing an example of a high lubrication mode.
Figure 5:
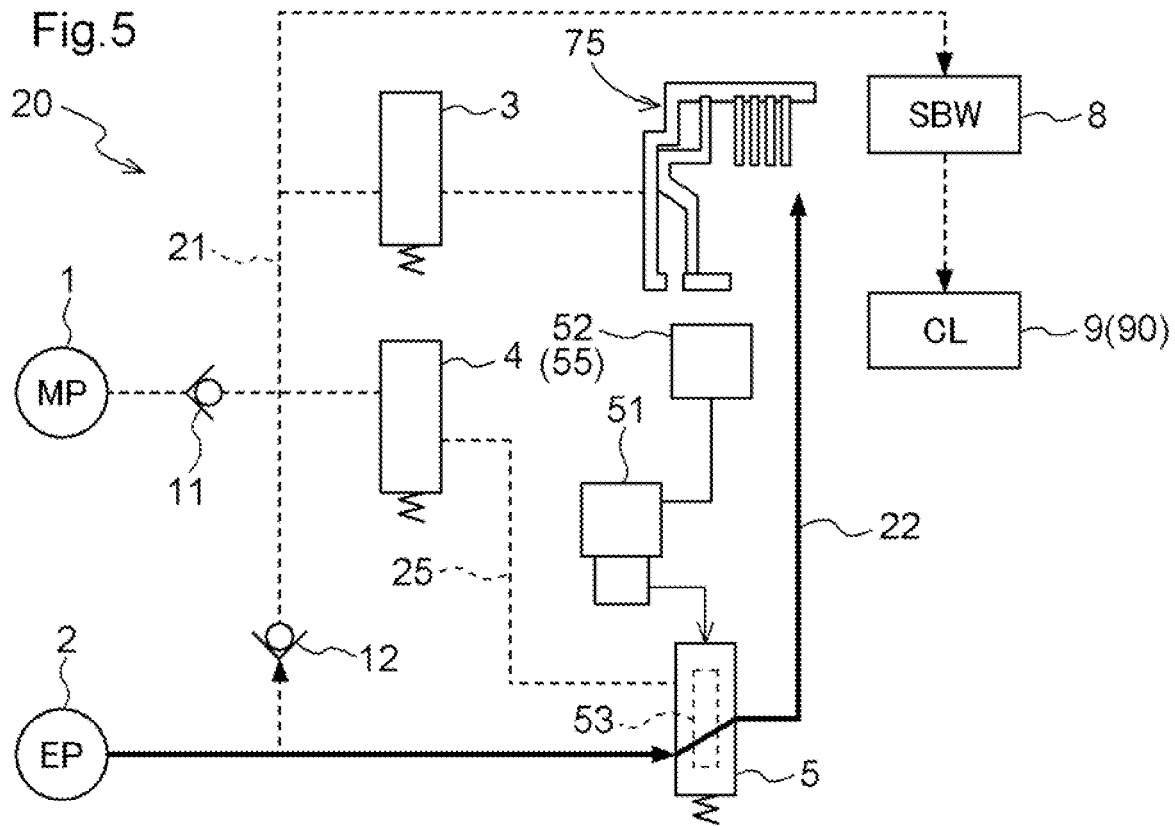
FIG. 5 is a hydraulic circuit diagram showing an example of a case in which an on-failure has occurred in a flow channel control valve.

An embodiment of a control device for a vehicle drive device will be described below based on the drawings. FIG. 1 is a schematic block diagram of a control device (drive control device 10) for a vehicle drive device and a vehicle drive device (drive device 50) which is a control target of the drive control device 10. The drive device 50 includes an internal combustion engine 70 (EG) and a rotating electrical machine 80 (MG) as drive power sources of wheels W. In addition, in the drive device 50 there are disposed a drive power source engagement device 75, the rotating electrical machine 80, and a transmission device 90 (TM) in this order from an input member IN side in a power transfer path that connects the input member IN drive-coupled to the internal combustion engine 70 to an output member OUT drive-coupled to the wheels W.

Note that the term "drive-coupled" used here refers to a state in which two rotating elements are coupled together such that they can transfer drive power. Specifically, the term "drive-coupled" includes a state in which the two rotating elements are coupled together such that they rotate together, or a state in which the two rotating elements are coupled together such that they can transfer drive power through one or two or more power transfer members. Such power transfer members include various types of members that transfer rotation at the same speed or at a changed speed, and include, for example, shafts, gear mechanisms, belts, and chains. In addition, such power transfer members may include engagement devices that selectively transfer rotation and drive power, e.g., friction engagement devices and mesh engagement devices.

The drive control device 10 controls each part of the above-described drive device 50. In the present embodiment, the drive control device 10 includes an inverter control device 56 (INV-CTRL) which is a core for controlling the rotating electrical machine 80 through an inverter (INV) 60; an internal combustion engine control device 57 (EG-CTRL) which is a core for controlling the internal combustion engine 70; a transmission device control device 59 (TM-CTRL) which is a core for controlling the transmission device 90; and a travel control device 55 (DRV-CTRL) that has control over the control devices (56, 57, and 59). In addition, a vehicle also includes a vehicle control device 100 (VHL-CTRL) which is a host control device for the drive control device 10 and controls the entire vehicle. These control devices (particularly, 55, 56, 57, and 59) represent functional parts and do not necessarily need to be formed physically independently of each other. For example, the travel control device 55 may be a single control unit and those functional parts may be constructed by a program, etc.

As shown in FIG. 1, the drive device 50 is a hybrid drive device of a so-called parallel system including the internal combustion engine 70 and the rotating electrical machine 80 as drive power sources of the vehicle. The internal combustion engine 70 is a heat engine driven by combustion of a fuel, and for example, a gasoline engine or a diesel engine can be used. The internal combustion engine 70 and the rotating electrical machine 80 are drive-coupled to each other through the drive power source engagement device 75, and depending on the state of the drive power source engagement device 75, switching can be performed between a state in which drive power is transferred between the internal combustion engine 70 and the rotating electrical machine 80 and a state in which drive power is not transferred between the internal combustion engine 70 and the rotating electrical machine 80.

The rotating electrical machine 80 is a rotating electrical machine that operates by multiphase alternating current (e.g., three-phase alternating current), and can function as both a motor and a generator. As described above, drive of the rotating electrical machine 80 is controlled by the inverter control device 56 through the inverter 60. The inverter 60 is connected to a direct-current power supply 61 and connected to the alternating-current rotating electrical machine 80 so as to perform electric power conversion between direct current and multiphase alternating current (e.g., three-phase alternating current). The rotating electrical machine 80 converts electric power from the direct-current power supply 61 into power through the inverter 60 (motoring). Alternatively, the rotating electrical machine 80 converts rotational drive power transferred from the internal combustion engine 70 or the wheels W into electric power and charges the direct-current power supply 61 through the inverter 60 (regeneration).

The direct-current power supply 61 serving as an electric power supply for driving the rotating electrical machine 80 is composed of, for example, a secondary battery (battery) such as a nickel-hydrogen battery or a lithium-ion battery, or an electric double-layer capacitor. To supply electric power to the rotating electrical machine 80, the direct-current power supply 61 is a high-voltage, large-capacity direct-current power supply. The rated power supply voltage of the direct-current power supply 61 is, for example, 200 to 400 [V].

As described above, depending on the state of the drive power source engagement device 75, switching can be performed between a state in which drive power is transferred between the internal combustion engine 70 and the rotating electrical machine 80 and a state in which drive power is not transferred between the internal combustion engine 70 and the rotating electrical machine 80. For example, when the internal combustion engine 70 rotates, the drive power source engagement device 75 is in an engaged state, and the rotating electrical machine 80 rotates following the internal combustion engine 70, the internal combustion engine 70 serves as a drive power source of the wheels W and the rotating electrical machine 80 functions as a generator, by which the direct-current power supply 61 can be charged (an engine travel mode or an engine travel and charge mode). In addition, when the internal combustion engine 70 is stopped, the drive power source engagement device 75 is in a disengaged state, and the rotating electrical machine 80 rotates, the rotating electrical machine 80 serves as a drive power source of the wheels W (an electric vehicle (EV) travel mode).

In addition, when the internal combustion engine 70 rotates, the drive power source engagement device 75 is in an engaged state, and the rotating electrical machine 80 also rotates, the internal combustion engine 70 and the rotating electrical machine 80 serve as drive power sources of the wheels W (hybrid travel mode). Specifically, in a state in which the drive control device 10 performs hybrid travel control and the internal combustion engine 70 outputs torque, the sum of output torque of the rotating electrical machine 80 and output torque of the internal combustion engine 70 which is transferred through the drive power source engagement device 75 is transferred to the wheels W.

Note that when the drive power source engagement device 75 is engaged, the internal combustion engine 70 can start by rotation of the rotating electrical machine 80. That is, the internal combustion engine 70 can start following the rotating electrical machine 80. For example, a transition from an EV travel mode to a hybrid travel mode can be made. On the other hand, the internal combustion engine 70 can also start independently of the rotating electrical machine 80. When the drive power source engagement device 75 is in a disengaged state, the internal combustion engine 70 is started by a starter 71 (AS: alternator starter).

The transmission device 90 is a stepped automatic transmission device having a plurality of shift speeds with different gear ratios. For example, the transmission device 90 includes a gear mechanism such as a planetary gear mechanism and a plurality of engagement devices (clutches, a brake, etc.) to form a plurality of shift speeds. Each of the plurality of engagement devices included in the transmission device 90 is a transmission engagement device 9 (see FIG. 2, etc.). An input shaft of the transmission device 90 is drive-coupled to an output shaft (e.g., a rotor shaft) of the rotating electrical machine 80. Here, a member to which the input shaft of the transmission device 90 and the output shaft of the rotating electrical machine 80 are drive-coupled is referred to as an intermediate member M. The rotational speed and torque of the internal combustion engine 70 and the rotating electrical machine 80 are transferred to the input shaft of the transmission device 90.

The transmission device 90 changes the rotational speed transferred to the transmission device 90, at a gear ratio of each shift speed, and converts the torque transferred to the transmission device 90 and transfers the converted torque to an output shaft of the transmission device 90. The output shaft of the transmission device 90 is split into two axles through, for example, a differential gear (output differential gear device), and the torque is transferred to the wheels W drive-coupled to the respective axles. Here, the gear ratio is the ratio of the rotational speed of the input shaft to the rotational speed of the output shaft (=the rotational speed of the input shaft/the rotational speed of the output shaft) obtained when each shift speed is formed in the transmission device 90. In addition, torque obtained by multiplying torque transferred to the transmission device 90 from the input shaft by a gear ratio corresponds to torque transferred to the output shaft.

Note that although here a mode is exemplified in which a stepped transmission mechanism is provided as the transmission device 90, the transmission device 90 may include a continuously variable transmission mechanism. For example, the transmission device 90 may include a continuously variable transmission (CVT) that allows continuous gear changes by looping a belt or a chain around two pulleys to change the diameters of the pulleys. In this case, it is preferred that oil for engagement control which is supplied to an engagement pressure flow channel 21 include oil for generating oil pressure that drives moving sheaves of the pulleys.

Meanwhile, in FIG. 1, reference sign 73 indicates a rotation sensor (input member rotation sensor) that detects the rotational speed of the internal combustion engine 70 or the input member IN, and reference sign 93 indicates a rotation sensor (output member rotation sensor) that detects the rotational speed of the wheels W or the output member OUT. In addition, reference sign 83 indicates a rotation sensor (rotating electrical machine rotation sensor) such as a resolver that detects the rotation (speed, direction, angular velocity, etc.) of a rotor of the rotating electrical machine 80. In addition, the drive power source engagement device 75 may include a temperature sensor 77 that detects the temperature of the drive power source engagement device 75. Note that in FIG. 1 various types of oil pumps, a hydraulic circuit, etc., which will be described later are omitted.

The drive device 50 includes a hydraulic circuit for supplying oil for engagement control to the drive power source engagement device 75 and a transmission engagement device (reference sign 9 shown in FIG. 2, etc.) included in the transmission device 90, and supplying oil for lubrication for cooling for these engagement devices and the rotating electrical machine 80. Block diagrams of FIGS. 2 to 5 show a part of a hydraulic circuit 20.

Here, a mode is exemplified in which the hydraulic circuit 20 includes an engagement pressure flow channel 21 that supplies oil for engagement control to the drive power source engagement device 75 and the transmission engagement device 9 included in the transmission device 90; a lubrication flow channel 22 that supplies oil for lubrication to the drive power source engagement device 75; and a bypass flow channel 25 that allows oil to flow from the engagement pressure flow channel 21 to the lubrication flow channel 22. In addition, the hydraulic circuit 20 includes a first pump 1 (mechanical oil pump) driven by at least one of the internal combustion engine 70 and the rotating electrical machine 80 and having a discharge port connected to the engagement pressure flow channel 21; and a second pump 2 driven by a power source different from the internal combustion engine 70 and the rotating electrical machine 80. The second pump 2 is, for example, a motor-driven oil pump driven by an electric motor.

The drive power source engagement device 75 is connected to the engagement pressure flow channel 21 through a first valve 3 (e.g., a linear solenoid valve). The engagement pressure of the drive power source engagement device 75 is controlled by the travel control device 55 (drive control device 10) through the first valve 3. In addition, the engagement pressure flow channel 21 is connected to a shift-by-wire circuit 8 (SBW) and the transmission engagement device 9 (CL) included in the transmission device 90. The shift-by-wire circuit 8 controls a parking brake of the vehicle or sets a shift speed instructed by an occupant through a shift lever, etc.

The bypass flow channel 25 connects the engagement pressure flow channel 21 to the lubrication flow channel 22 through a second valve 4 (e.g., a primary regulator valve) and a flow channel control valve 5 which will be described later. The flow channel control valve 5 selectively switches flow channels between a first state in which the outflow destination of oil discharged from the second pump 2 is the engagement pressure flow channel 21 and a second state in which the outflow destination of oil discharged from the second pump 2 is the lubrication flow channel 22. The flow channel control valve 5 is composed of, for example, a solenoid valve controlled by an on/off solenoid 51 based on a control signal from the travel control device 55. In the present embodiment, when the on/off solenoid 51 is in an off state, the flow channel control valve 5 goes into the first state, and when the on/off solenoid 51 is in an on state, the flow channel control valve 5 goes into the second state.

Note that although in the above description the first state and the second state are defined by the outflow destination of oil discharged from the second pump 2, since oil is not discharged from the second pump 2 when the second pump 2 is stopped, the first state and the second state may be defined as follows. Specifically, it can also be said that the first state is a state in which the engagement pressure flow channel 21 is connected to the lubrication flow channel 22 through the bypass flow channel 25 (a state in which the bypass flow channel 25 is connected to the lubrication flow channel 22) and the second state is a state in which the engagement pressure flow channel 21 is disconnected from the lubrication flow channel 22 (a state in which the bypass flow channel 25 is disconnected from the lubrication flow channel 22).

By the action of the first pump 1, the second pump 2, the first valve 3, the second valve 4, and the flow channel control valve 5, the hydraulic circuit 20 can operate, for example, in the following modes. FIGS. 2 and 3 show exemplary operation for a case in which the lubrication and cooling of the drive power source engagement device 75 are not required so much and thus a relatively small amount of oil flows through the lubrication flow channel 22 (low lubrication mode), and FIG. 4 shows exemplary operation for a case in which the lubrication and cooling of the drive power source engagement device 75 are required and thus a relatively large amount of oil flows through the lubrication flow channel 22 (high lubrication mode). In the low lubrication mode, a small amount of oil branched from the engagement pressure flow channel 21 is supplied to the lubrication flow channel 22. In the high lubrication mode, a large amount of oil is independently supplied to the lubrication flow channel 22.

In a state in which a first engagement element 74 on an input member IN side of the drive power source engagement device 75 is engaged with a second engagement element 76 on a rotating electrical machine 80 side, a difference in rotational speed between the first engagement element 74 and the second engagement element 76 is small and friction force is also small, and thus, there is little need for lubrication and cooling. In addition, in a state in which the first engagement element 74 is disengaged from the second engagement element 76, too, friction force is small and thus there is little need for lubrication and cooling. In such a case, the drive control device 10 allows oil to flow through the lubrication flow channel 22 in the low lubrication mode.

On the other hand, when the drive power source engagement device 75 is in a slip-engaged state in which the first engagement element 74 on the input member IN side is engaged with the second engagement element 76 on the rotating electrical machine 80 side, with a difference in rotational speed present therebetween, since friction force is large, there is a great need for lubrication and cooling. In such a case, the drive control device 10 allows a large amount of oil to flow through the lubrication flow channel 22 in the high lubrication mode.

FIG. 2 exemplifies a mode (low lubrication mode) in which only the first pump 1 operates to supply oil to the hydraulic circuit 20, and FIG. 3 exemplifies a mode (low lubrication mode) in which only the second pump 2 operates to supply oil to the hydraulic circuit 20. In addition, FIG. 4 exemplifies a mode (high lubrication mode) in which both the first pump 1 and the second pump 2 operate to supply oil to the hydraulic circuit 20.

As described above, the first pump 1 is driven by at least one of the internal combustion engine 70 and the rotating electrical machine 80. Thus, when the hydraulic circuit 20 functions normally and the rotational speed of at least one of the internal combustion engine 70 and the rotating electrical machine 80 is greater than or equal to a set rotational speed having been set, the second pump 2 can be stopped. FIG. 2 exemplifies the hydraulic circuit 20 in such a case. On the other hand, when the rotational speeds of the internal combustion engine 70 and the rotating electrical machine 80 are substantially zero, e.g., upon the start of the vehicle, oil cannot be supplied from the first pump 1. Thus, in such a case, oil is supplied to the hydraulic circuit 20 using only the second pump 2. FIG. 3 exemplifies the hydraulic circuit 20 in such a case.

On the other hand, there is a case in which even when the hydraulic circuit 20 functions normally and the rotational speed of at least one of the internal combustion engine 70 and the rotating electrical machine 80 is greater than or equal to the set rotational speed having been set, the amount of oil flowing needs to be further increased. For example, it is preferable that when the drive power source engagement device 75 is in a slip-engaged state in which the first engagement element 74 on the input member IN side is engaged with the second engagement element 76 on the rotating electrical machine 80 side, with a difference in rotational speed present therebetween, the amount of oil flowing be increased for lubrication and cooling of the drive power source engagement device 75. In such a case, oil is supplied to the hydraulic circuit 20 using both the first pump 1 and the second pump 2. FIG. 4 exemplifies the hydraulic circuit 20 in such a case. Though details will be described later, the drive control device 10 controls the flow channel control valve 5 to the second state so as to switch from the mode shown in FIG. 2 (the mode (low lubrication mode) in which only the first pump 1 is driven and the flow channel control valve 5 is in the first state) to the mode shown in FIG. 4 (high lubrication mode), and drives the second pump 2.

As described above, the discharge port of the first pump 1 is connected to the engagement pressure flow channel 21 through a first check valve 11. The first check valve 11 is connected so as to allow the flow of oil in a direction going from the first pump 1 to the engagement pressure flow channel 21 and to shut off the flow of oil in an opposite direction. In the modes shown in FIGS. 2 to 4, a discharge port of the second pump 2 is also connected to the engagement pressure flow channel 21 through a second check valve 12. As with the first check valve 11, the second check valve 12 is also connected so as to allow the flow of oil in a direction going from the second pump 2 to the engagement pressure flow channel 21 and to shut off the flow of oil in an opposite direction.

In the mode exemplified in FIG. 2, only the first pump 1 operates and the second pump 2 is stopped, and thus, the first check valve 11 is in an open state and the second check valve 12 is in a closed state. In addition, the flow channel control valve 5 is controlled to the first state (a state in which the engagement pressure flow channel 21 is connected to the lubrication flow channel 22 through the bypass flow channel 25). As a result, oil is supplied to the shift-by-wire circuit 8 and the transmission engagement device 9 included in the transmission device 90 from the first pump 1 through the engagement pressure flow channel 21. FIG. 2 exemplifies a mode in which the drive power source engagement device 75 is controlled to a disengaged state, and as described above, in this state, a large amount of oil is not required for the lubrication and cooling of the drive power source engagement device 75. Oil is supplied to the lubrication flow channel 22 from the engagement pressure flow channel 21 through the bypass flow channel 25. Specifically, oil is supplied to the flow channel control valve 5 from the engagement pressure flow channel 21 through the second valve 4 and supplied to the lubrication flow channel 22 from the flow channel control valve 5.

In the mode exemplified in FIG. 3, only the second pump 2 operates and the first pump 1 is stopped, and thus, the second check valve 12 is in an open state and the first check valve 11 is in a closed state. As with the mode shown in FIG. 2, the flow channel control valve 5 is controlled to the first state (a state in which the engagement pressure flow channel 21 is connected to the lubrication flow channel 22 through the bypass flow channel 25 and a state in which the outflow destination of oil discharged from the second pump 2 is the engagement pressure flow channel 21). As a result, oil is supplied to the shift-by-wire circuit 8 and the transmission engagement device 9 included in the transmission device 90 from the second pump 2 through the engagement pressure flow channel 21. As in FIG. 2, FIG. 3 also exemplifies a mode in which the drive power source engagement device 75 is controlled to a disengaged state, and in this state, a large amount of oil is not required for the lubrication and cooling of the drive power source engagement device 75. Oil is supplied to the lubrication flow channel 22 from the engagement pressure flow channel 21 through the bypass flow channel 25. Specifically, oil is supplied to the flow channel control valve 5 from the engagement pressure flow channel 21 through the second valve 4 and supplied to the lubrication flow channel 22 from the flow channel control valve 5.

In the mode exemplified in FIG. 4, both the first pump 1 and the second pump 2 operate. As will be described later, oil is supplied to the engagement pressure flow channel 21 from the first pump 1 and oil is supplied to the lubrication flow channel 22 from the second pump 2. In the mode exemplified in FIG. 4, since oil is supplied to the lubrication flow channel 22 from the second pump 2, there is no need to supply oil to the lubrication flow channel 22 from the engagement pressure flow channel 21 through the bypass flow channel 25. Hence, unlike the modes shown in FIGS. 2 and 3, the flow channel control valve 5 is controlled to the second state (a state in which the engagement pressure flow channel 21 is disconnected from the lubrication flow channel 22 and a state in which the outflow destination of oil discharged from the second pump 2 is the lubrication flow channel 22).

As described above, the second valve 4 is provided between the engagement pressure flow channel 21 and the bypass flow channel 25. That is, the flow rate of oil flowing through the flow channel control valve 5 in the first state is substantially controlled by the second valve 4. On the other hand, the flow rate of oil flowing through the flow channel control valve 5 in the second state depends on the amount of oil discharged from the second pump 2. The discharge port of the second pump 2 is connected to the flow channel control valve 5 and the second check valve 12, and in the second state, the flow channel control valve 5 connects the discharge port of the second pump 2 to the lubrication flow channel 22 at a low resistance. Thus, the oil pressure on a second pump 2 side of the second check valve 12 is lower than the oil pressure of the engagement pressure flow channel 21 connected to the discharge port of the first pump 1, and the second check valve 12 acts to shut off the flow of oil. Hence, almost the entire amount of oil discharged from the second pump 2 is supplied to the lubrication flow channel 22 through the flow channel control valve 5, by which the drive power source engagement device 75 can be lubricated and cooled by a large amount of oil.

On the other hand, as described above by referring to FIG. 2, oil is supplied to the engagement pressure flow channel 21 from the first pump 1, and the oil is supplied to the shift-by-wire circuit 8 and the transmission engagement device 9 included in the transmission device 90. The mode shown in FIG. 4 exemplifies that the drive power source engagement device 75 is controlled to an engaged state or a slip-engaged state. Particularly, in the slip-engaged state, it is preferable to supply a large amount of oil for lubrication and cooling of the drive power source engagement device 75. As described above, since oil from the second pump 2 is supplied to the lubrication flow channel 22, while oil for engagement control is sufficiently supplied to the engagement pressure flow channel 21, oil for lubrication can also be sufficiently supplied to the lubrication flow channel 22.

As such, by providing the flow channel control valve 5, oil can be appropriately supplied to the engagement pressure flow channel 21 and the lubrication flow channel 22 using the first pump 1 and the second pump 2, according to a controlled state of the drive device 50 which is the control target.

However, if a failure or the like occurs in the flow channel control valve 5, then an appropriate oil supply such as that described above may be hindered. For example, a case is considered in which the on/off solenoid 51 fails and is fixed in an on state. As described above, when the on/off solenoid 51 is in an on state, the flow channel control valve 5 goes into the second state. The second state is a state in which the outflow destination of oil discharged from the second pump 2 is the lubrication flow channel 22. For example, as shown in FIG. 3, even when an attempt is made to control the hydraulic circuit 20 in the low lubrication mode by allowing only the second pump 2 to operate, oil discharged from the second pump 2 does not flow through the engagement pressure flow channel 21.

Hence, when a failure in which the flow channel control valve 5 is fixed in the second state has occurred, the drive control device 10 performs fail-safe control in which the rotational speed of at least one of the internal combustion engine 70 and the rotating electrical machine 80 is increased to supply oil to the engagement pressure flow channel 21 by the first pump 1, by which the drive power source engagement device 75 and the transmission engagement device 9 are controlled. Here, a target value of the increase in rotational speed by the fail-safe control is set to a rotational speed at which the required amount or more of oil discharged from the first pump 1 can be secured.

The required amount used here is, for example, an amount at which oil pressure required to perform control of engagement control of the drive power source engagement device 75 and the transmission engagement device 9 can be secured.

Figure 6:
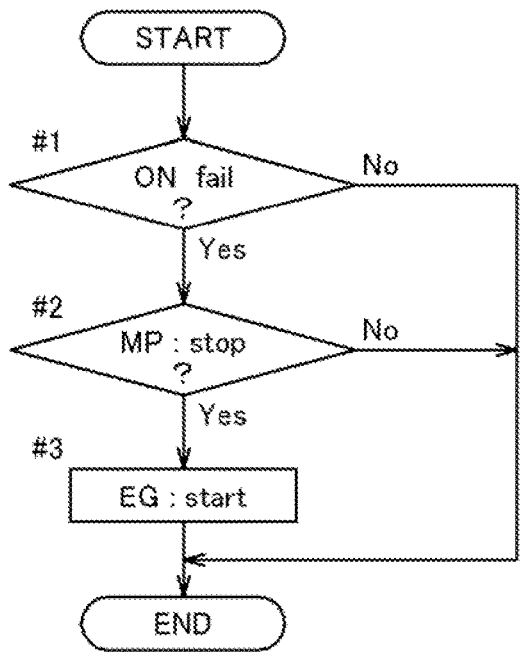
FIG. 6 is a flowchart showing another example of fail-safe control.

A flowchart of FIG. 6 shows an example of fail-safe control. First, the drive control device 10 determines whether a failure has occurred in the flow channel control valve 5 (including the on/off solenoid 51) (#1). The failure can be determined, for example, from the control state of the on/off solenoid 51 by a control circuit (solenoid control circuit 52) for the on/off solenoid 51 or a result of detection by an oil pressure sensor 53 such as an oil pressure switch installed on the flow channel control valve 5. The solenoid control circuit 52 may be provided with a monitoring circuit that monitors the operating state of the on/off solenoid 51 or a feedback circuit, and in this case, the solenoid control circuit 52 can determine the operating state of the on/off solenoid 51. In addition, when the flow channel control valve 5 includes the oil pressure sensor 53, in this case, the state of the flow channel control valve 5 can be detected by the oil pressure sensor 53.

If a failure has not occurred in the flow channel control valve 5, then the process ends without performing fail-safe control. If the drive control device 10 determines that a failure has occurred in the flow channel control valve 5, then the drive control device 10 determines whether the first pump 1 is stopped (#2). If the first pump 1 is driven, then oil can be supplied to the engagement pressure flow channel 21 from the first pump 1 and thus the process ends without performing fail-safe control. If a failure has occurred in the flow channel control valve 5 and the first pump 1 is stopped, then the drive control device 10 performs fail-safe control in which the first pump 1 is driven by, for example, starting the internal combustion engine 70 (#3).

Note that although here a mode is exemplified in which the internal combustion engine 70 starts at step #3, when the first pump 1 is driven by the rotating electrical machine 80 or when the first pump 1 is driven by at least one of the internal combustion engine 70 and the rotating electrical machine 80, the first pump 1 may be driven by starting the rotating electrical machine 80.

For example, when the first pump 1 is connected to the input member IN or the first engagement element 74 of the drive power source engagement device 75 and driven by drive power of the internal combustion engine 70, at step #3, the internal combustion engine 70 starts. In addition, when the first pump 1 is connected to the intermediate member M or the second engagement element 76 of the drive power source engagement device 75 and driven by drive power of the rotating electrical machine 80, at step #3, the rotating electrical machine 80 may start. Regardless of whether the first pump 1 is connected to the input member IN side (the input member IN or the first engagement element 74) or connected to the rotating electrical machine 80 side (the intermediate member M or the second engagement element 76), as long as the first engagement element 74 is in an engaged state, the first pump 1 can be driven by drive power of either one of the internal combustion engine 70 and the rotating electrical machine 80. Thus, at step #3, the internal combustion engine 70 may start or the rotating electrical machine 80 may start.

In addition, although here a mode is exemplified in which it is determined at step #2 whether the first pump 1 is stopped, a mode may be adopted in which it is determined whether the amount of oil discharged from the first pump 1 is less than or equal to a lower limit amount of oil discharged. That is, a mode may be adopted in which even when the first pump 1 is driven, if the amount of oil discharged therefrom is less than the lower limit amount of oil discharged, then fail-safe control is performed. In addition, a mode may be adopted in which it is determined whether the rotational speed of a power source (here, at least one of the internal combustion engine 70 and the rotating electrical machine 80) that drives the first pump 1 is less than a lower limit rotational speed (which may be the above-described set rotational speed). Even when the first pump 1 is driven, if the rotational speed of the power source is low, then the first pump 1 cannot sufficiently supply oil, and thus, a mode may be adopted in which fail-safe control is performed when the rotational speed of the power source is less than the lower limit rotational speed.

When step #2 adopts such a mode, the internal combustion engine 70 or the rotating electrical machine 80 which is the power source of the first pump 1 is not stopped, and thus, at step #3, it is preferred to increase the rotational speed of the internal combustion engine 70 or the rotating electrical machine 80 instead of starting the internal combustion engine 70 or the rotating electrical machine 80. Note that starting the internal combustion engine 70 or the rotating electrical machine 80 indicates generation of rotational speed from a state in which the rotational speed is zero, and thus is included in the increase in rotational speed.

As described above by referring to FIG. 6, when the internal combustion engine 70 is stopped, the drive control device 10 starts the internal combustion engine 70. Hence, even when the internal combustion engine 70 is being stopped when fail-safe control needs to be performed, by starting the internal combustion engine 70, the first pump (1) is driven by drive power of the internal combustion engine 70, by which oil can be supplied to the engagement pressure flow channel 21 by the first pump 1.

It is preferred that during performance of fail-safe control, the drive control device 10 bring the drive power source engagement device 75 into an open state and bring the transmission engagement device 9 into an engaged state, with the internal combustion engine 70 started. By bringing the drive power source engagement device 75 into an open state, the internal combustion engine 70 is separated from a power transfer path to the wheels W. Drive power of the internal combustion engine 70 does not affect drive power of the wheels W, and the first pump 1 can be appropriately driven by the drive power of the internal combustion engine 70 while the vehicle travels stably.

In addition, it is preferred that during performance of fail-safe control by the drive control device 10 in which the first pump 1 is driven by the internal combustion engine 70 to bring the drive power source engagement device 75 into an open state and bring the transmission engagement device 9 into an engaged state, the wheels W be driven by the rotating electrical machine 80. When the internal combustion engine 70 and the rotating electrical machine 80 are provided as drive power sources of the wheels W, so-called EV travel that uses only the rotating electrical machine 80 as a drive power source of the wheels W is also possible. In a case of the EV travel, drive power of the internal combustion engine 70 is not transferred to the wheels W, and thus, the first pump 1 can be appropriately driven by the drive power of the internal combustion engine 70 and the wheels W can be appropriately driven by drive power of the rotating electrical machine 80.

Figure 7:
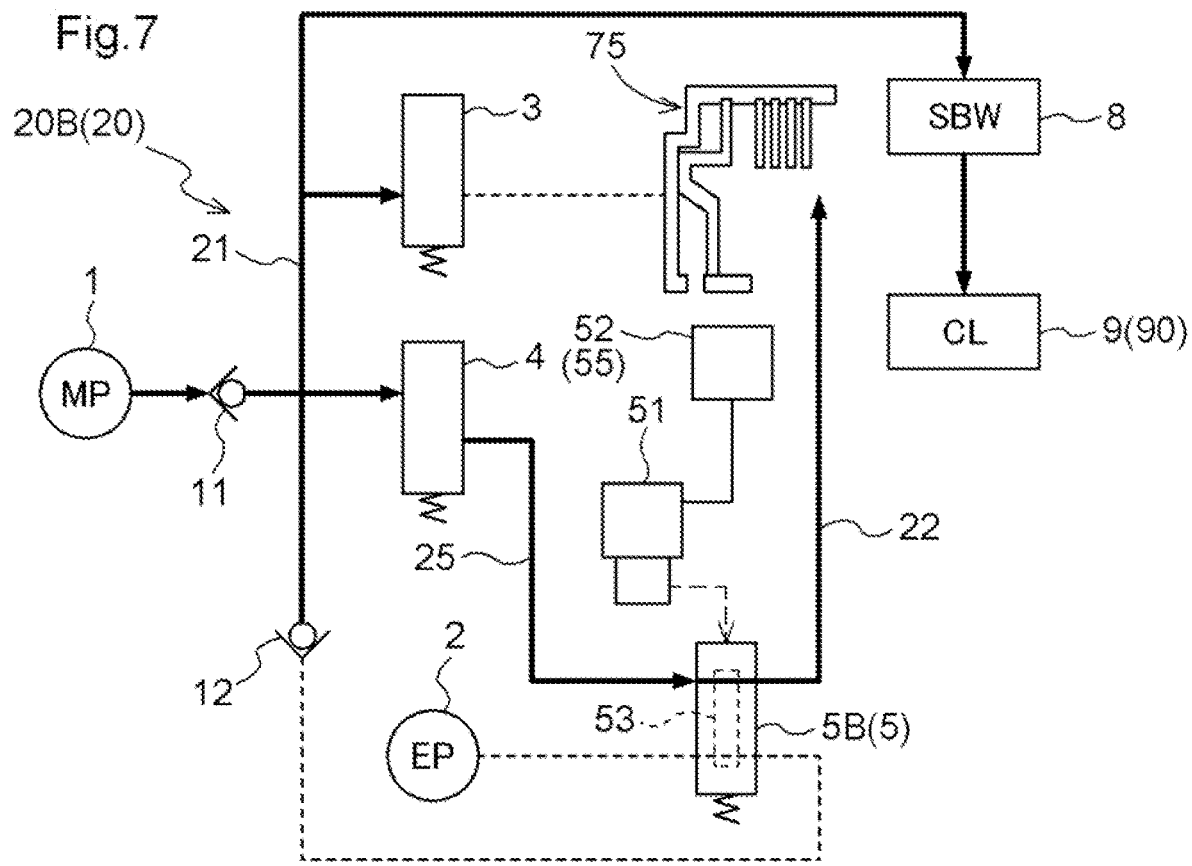
FIG. 7 is a hydraulic circuit diagram showing another example of the low lubrication mode using the first pump.
Figure 8:
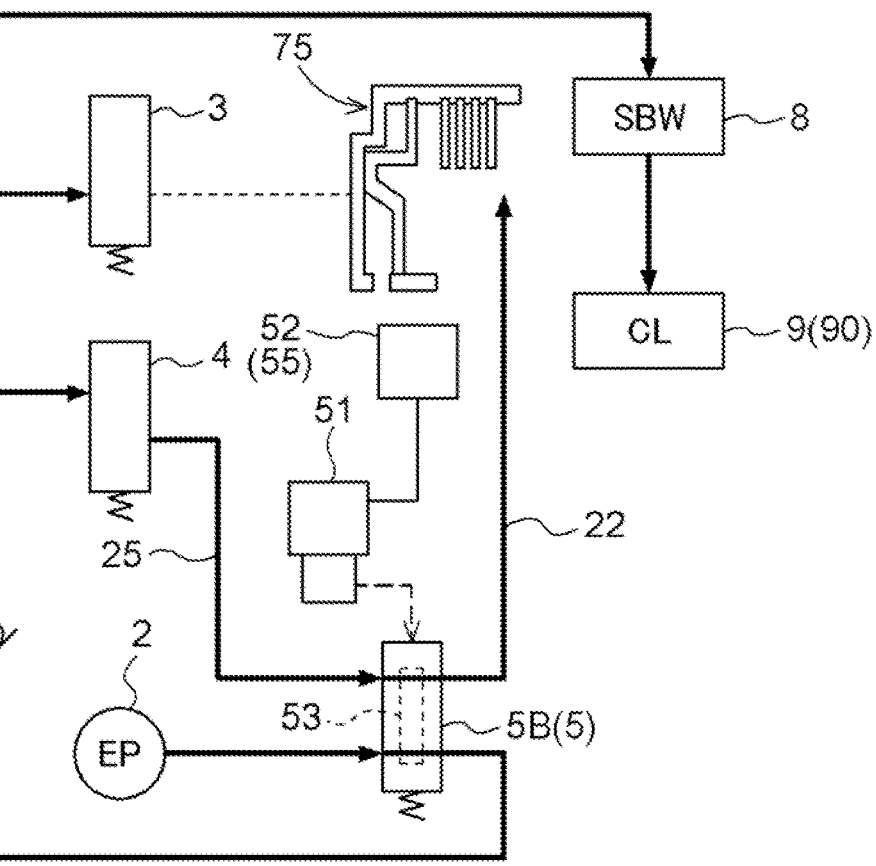
FIG. 8 is a hydraulic circuit diagram showing another example of the low lubrication mode using the second pump.
Figure 9:
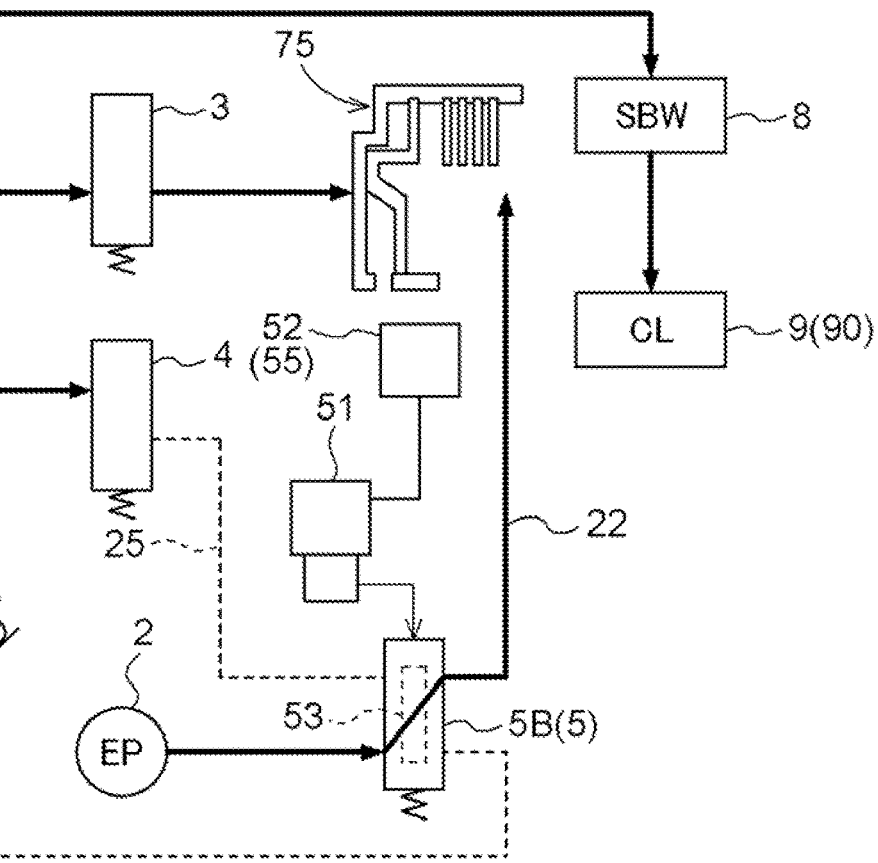
FIG. 9 is a hydraulic circuit diagram showing an example of the high lubrication mode.

Meanwhile, the configuration of the hydraulic circuit 20 is not limited to the modes exemplified in FIGS. 2 to 5, and for example, modes such as a second hydraulic circuit 20B exemplified in FIGS. 7 to 9 may be adopted. FIG. 7 corresponds to FIG. 2 and exemplifies a mode in which only the first pump 1 operates to supply oil to the second hydraulic circuit 20B, and FIG. 8 corresponds to FIG. 3 and exemplifies a mode in which only the second pump 2 operates to supply oil to the second hydraulic circuit 20B. In addition, FIG. 9 corresponds to FIG. 4 and exemplifies a mode in which both the first pump 1 and the second pump 2 operate to supply oil to the second hydraulic circuit 20B.

The modes shown in FIGS. 2 to 4 differ from the modes shown in FIGS. 7 to 9 in that in the modes shown in FIGS. 2 to 4, the discharge port of the second pump 2 is connected to the second check valve 12 and the flow channel control valve 5, whereas in the modes shown in FIGS. 7 to 9, the discharge port of the second pump 2 is connected only to the flow channel control valve 5 (second flow channel control valve 5B) without being connected to the second check valve 12. In addition, the modes shown in FIGS. 2 to 4 differ from the modes shown in FIGS. 7 to 9 in that in the modes shown in FIGS. 2 to 4, the flow channel control valve 5 selectively connects two input ports to one output port, whereas in the modes shown in FIGS. 7 to 9, the second flow channel control valve 5B selects a connection destination of each of the two input ports.

That is, in the modes shown in FIGS. 2 to 4, the flow channel control valve 5 selectively controls a state (first state) in which a first input port connected to the bypass flow channel 25 is connected to the output port, and a state (second state) in which a second input port connected to the second pump 2 is connected to the output port. On the other hand, the second flow channel control valve 5B in the modes shown in FIGS. 7 to 9 selectively controls the first input port connected to the bypass flow channel 25 to a state (first state) in which the first input port is connected to a first output port connected to the lubrication flow channel 22 and a state (second state) in which a flow channel is disconnected, and selectively controls the second input port connected to the second pump 2 to a state (first state) in which the second input port is connected to a second output port connected to the engagement pressure flow channel 21 (second check valve 12) and a state (second state) in which the second input port is connected to the first output port connected to the lubrication flow channel 22. In the modes shown in FIGS. 7 to 9, too, when the on/off solenoid 51 is in an off state, the second flow channel control valve 5B goes into the first state, and when the on/off solenoid 51 is in an on state, the second flow channel control valve 5B goes into the second state.

The operation of the second hydraulic circuit 20B shown in FIGS. 7 to 9 is the same as that in the modes described above by referring to FIGS. 2 to 4, and thus, a detailed description thereof is omitted. In addition, a case in which in the second hydraulic circuit 20B shown in FIGS. 7 to 9, a failure has occurred in the second flow channel control valve 5B and the second flow channel control valve 5B is fixed in the second state is apparent from the modes described above by referring to FIGS. 3 and 5, and thus, the depiction and detailed description thereof are omitted. In the second hydraulic circuit 20B shown in FIGS. 7 to 9, too, the second flow channel control valve 5B selectively switches flow channels between the first state in which the outflow destination of oil discharged from the second pump 2 is the engagement pressure flow channel 21 and the second state in which the outflow destination of oil discharged from the second pump 2 is the lubrication flow channel 22. When a failure in which the second flow channel control valve 5B is fixed in the second state has occurred, the drive control device 10 can perform fail-safe control in which the rotational speed of at least one of the internal combustion engine 70 and the rotating electrical machine 80 is increased to supply oil to the engagement pressure flow channel 21 by the first pump 1, by which the drive power source engagement device 75 and the transmission engagement device 9 are controlled.

Summary of the Embodiment

A summary of a control device (10) for a vehicle drive device described above will be briefly described below.

In one aspect, a control device (10) for a vehicle drive device is the control device (10) for a vehicle drive device whose control target is a vehicle drive device (50) including an internal combustion engine (70) and a rotating electrical machine (80) as drive power sources of wheels (W), and having a drive power source engagement device (75), the rotating electrical machine (80), and a transmission device (90) disposed from an input member (IN) side in a power transfer path connecting an input member (IN) drive-coupled to the internal combustion engine (70) to an output member (OUT) drive-coupled to the wheels (W), and the vehicle drive device (50) includes an engagement pressure flow channel (21) that supplies oil for engagement control to the drive power source engagement device (75) and a transmission engagement device (9) included in the transmission device (90); a lubrication flow channel (22) that supplies oil for lubrication to the drive power source engagement device (75); a first pump (1) driven by at least one of the internal combustion engine (70) and the rotating electrical machine (80) and having a discharge port connected to the engagement pressure flow channel (21); a second pump (2) driven by a power source different from the internal combustion engine (70) and the rotating electrical machine (80); and a flow channel control valve (5) that selectively switches flow channels between a first state in which an outflow destination of oil discharged from the second pump (2) is the engagement pressure flow channel (21) and a second state in which an outflow destination of oil discharged from the second pump (22) is the lubrication flow channel (22), and when a failure in which the flow channel control valve (5) is fixed in the second state has occurred, fail-safe control (#3) is performed in which a rotational speed of at least one of the internal combustion engine (70) and the rotating electrical machine (80) is increased to supply oil to the engagement pressure flow channel (21) by the first pump (1), by which the drive power source engagement device (75) and the transmission engagement device (9) are controlled.

When a failure in which the flow channel control valve (5) is fixed in the second state has occurred, the outflow destination of oil discharged from the second pump (2) is fixed to the lubrication flow channel (22). Here, for example, when the discharge pressure of the first pump (1) is insufficient, sufficient oil is not supplied to the engagement pressure flow channel (21). According to this configuration, when a failure in which the flow channel control valve (5) is fixed in the second state has occurred, by performing fail-safe control (#3) to increase the rotational speed of at least one of the internal combustion engine (70) and the rotating electrical machine (80) which are power sources that drive the first pump (1), the discharge pressure of the first pump (1) can be increased. Namely, even when oil cannot be supplied to the engagement pressure flow channel (21) from the second pump (2), oil is supplied to the engagement pressure flow channel (21) by the first pump (1), by which the drive power source engagement device (75) and the transmission engagement device (9) can be controlled. As such, according to this configuration, there is included the flow channel control valve (5) that can switch the destination of oil discharged from the pump (2) driven by a power source different from the drive power sources (70 and 80) of the wheels (W) to an oil passage for lubrication and cooling (22) or an oil passage for engagement control (21), and even when a failure has occurred in which the flow channel control valve (5) is fixed to a side where the oil passage for lubrication and cooling (22) is connected to the pump (2), oil can be appropriately supplied to the oil passage for engagement control (21).

Here, it is preferred that the second pump (2) be a motor-driven oil pump driven by an electric motor.

According to this configuration, regardless of the drive state of the wheels (W), the second pump (2) can be stably and appropriately driven by using an electric motor.

In addition, in the control device (10) for a vehicle drive device, it is preferred that in the fail-safe control (#3), a rotational speed of the internal combustion engine (70) be increased to supply oil to the engagement pressure flow channel (21) by the first pump (1).

According to this configuration, even when drive power of the internal combustion engine (70) is used to drive the wheels (W), by increasing drive power of the internal combustion engine (70), the first pump (1) can be appropriately driven.

In addition, in the control device (10) for a vehicle drive device, it is preferred that in the fail-safe control (#3), when the internal combustion engine (70) is stopped, the internal combustion engine (70) be allowed to start to supply oil to the engagement pressure flow channel (21) by the first pump (1).

Even when the internal combustion engine (70) is being stopped when fail-safe control (#3) needs to be performed, by starting the internal combustion engine (70), the first pump (1) can be driven by drive power of the internal combustion engine (70).

In addition, in the control device (10) for a vehicle drive device, it is preferred that in the fail-safe control (#3), the drive power source engagement device (75) be brought into an open state and the transmission engagement device (9) be brought into an engaged state, with the internal combustion engine (70) started.

By bringing the drive power source engagement device (75) into an open state, the internal combustion engine (70) is separated from a power transfer path to the wheels (W), and thus, the first pump (1) can be appropriately driven by drive power of the internal combustion engine (70). In addition, even when drive power of the internal combustion engine (70) is used to drive the first pump (1), it does not affect drive power of the wheels (W), and thus, fail-safe control (#3) can be performed while the vehicle travels stably.

In addition, in the control device (10) for a vehicle drive device, it is preferred that during performance of the fail-safe control (#3), the first pump (1) be driven by the internal combustion engine (70) to bring the drive power source engagement device (75) into an open state and bring the transmission engagement device (9) into an engaged state, and the wheels (W) be driven by the rotating electrical machine (80).

When the internal combustion engine (70) and the rotating electrical machine (80) are provided as drive power sources of the wheels (W), so-called EV travel that uses only the rotating electrical machine (80) as a drive power source is also possible. In that case, drive power of the internal combustion engine (70) is not transferred to the wheels (W). By driving the first pump (1) by drive power of the internal combustion engine (70), fail-safe control (#3) can be performed without affecting drive power of the wheels (W).

In addition, in the control device (10) for a vehicle drive device, it is preferred that a determination as to whether a failure in which the flow channel control valve (5) is fixed in the second state has occurred be made based on a control state of a solenoid (51) by a solenoid control circuit (52) or a result of detection by an oil pressure sensor (53) installed on the flow channel control valve (5), the solenoid (51) switching the flow channel control valve (5) between the first state and the second state, and the solenoid control circuit (52) controlling the solenoid (51).

For example, when the solenoid (51) has failed, the state of the flow channel control valve (5) may be fixed. The solenoid control circuit (52) may be provided with a monitoring circuit that monitors the operating state of the solenoid (51) or a feedback circuit, and in many cases, the solenoid control circuit (52) can determine the operating state of the solenoid (51). In addition, when the flow channel control valve (5) includes the oil pressure sensor (53), the state of the flow channel control valve (5) can be detected by the oil pressure sensor (53). According to this configuration, the control device (10) for a vehicle drive device can promptly determine whether the flow channel control valve (5) has failed, based on a control state by the solenoid control circuit (52) or a result of detection by the oil pressure sensor (53), and appropriately perform fail-safe control (#3).

In addition, in the control device (10) for a vehicle drive device, it is preferred that when a failure has not occurred in the flow channel control valve (5) and a rotational speed of at least one of the internal combustion engine (70) and the rotating electrical machine (80) is greater than or equal to a set rotational speed having been set, the second pump (2) be stopped.

When a failure has not occurred in the flow channel control valve (5), oil can be supplied to the engagement pressure flow channel (21) using either one of the first pump (1) and the second pump (2). When the discharge pressure of the first pump (1) is sufficient, oil can be supplied to the engagement pressure flow channel (21) only by the first pump (1) without driving the second pump (2). Since power sources that drive the first pump (1) are the internal combustion engine (70) and the rotating electrical machine (80), when the rotational speed of at least one of them is greater than or equal to the set rotational speed, the second pump (2) is stopped, by which energy savings can be achieved.

In the control device (10) for a vehicle drive device, in a state in which a failure has not occurred in the flow channel control valve (5), a rotational speed of at least one of the internal combustion engine (70) and the rotating electrical machine (80) is greater than or equal to the set rotational speed, and the second pump (2) is stopped, it is preferred that when the drive power source engagement device (75) is in a slip-engaged state in which an engagement element (74) on an input member (IN) side is engaged with an engagement element (76) on a rotating electrical machine (80) side, with a difference in rotational speed present between the engagement elements (74 and 76), the flow channel control valve (5) be controlled to the second state and the second pump (2) be driven.

In the slip-engaged state, the friction force of the drive power source engagement device (75) is large and heat generation is also large. As in the present configuration, by controlling the flow channel control valve (5) to the second state and driving the second pump (2), more oil can be supplied to the lubrication flow channel (22) and thus the lubrication and cooling performance of the drive power engagement device (75) can be improved.

REFERENCE SIGNS LIST

1: First pump, 2: Second pump, 5: Flow channel control valve, 5B: Second flow channel control valve (flow channel control valve), 9: Transmission engagement device, 10: Drive control device (control device for a vehicle drive device), 21: Engagement pressure flow channel, 22: Lubrication flow channel, 25: Bypass flow channel, 50: Drive device (vehicle drive device), 51: On/off solenoid (solenoid), 52: Solenoid control circuit, 53: Oil pressure sensor, 70: Internal combustion engine, 74: First engagement element (engagement element on an input member side), 75: Drive power source engagement device, 76: Second engagement element (engagement element on a rotating electrical machine side), 80: Rotating electrical machine, 90: Transmission device, IN: Input member, OUT: Output member, and W: Wheel

The invention claimed is:

1. A control device for a vehicle drive device whose control target is a vehicle drive device including an internal combustion engine and a rotating electrical machine as drive power sources of wheels, and having a drive power source engagement device, the rotating electrical machine, and a transmission device disposed from an input member side in a power transfer path connecting an input member drive-coupled to the internal combustion engine to an output member drive-coupled to the wheels, wherein
the vehicle drive device includes:
an engagement pressure flow channel that supplies oil for engagement control to the drive power source engagement device and a transmission engagement device included in the transmission device;
a lubrication flow channel that supplies oil for lubrication to the drive power source engagement device;
a first pump driven by at least one of the internal combustion engine and the rotating electrical machine and having a discharge port connected to the engagement pressure flow channel;
a second pump driven by a power source different from the internal combustion engine and the rotating electrical machine; and
a flow channel control valve that selectively switches flow channels between a first state in which an outflow destination of oil discharged from the second pump is the engagement pressure flow channel and a second state in which an outflow destination of oil discharged from the second pump is the lubrication flow channel, and
when a failure in which the flow channel control valve is fixed in the second state has occurred, fail-safe control is performed in which a rotational speed of at least one of the internal combustion engine and the rotating electrical machine is increased to supply oil to the engagement pressure flow channel by the first pump, by which the drive power source engagement device and the transmission engagement device are controlled.

2. The control device for a vehicle drive device according to claim 1, wherein the second pump is a motor-driven oil pump driven by an electric motor.

3. The control device for a vehicle drive device according to claim 1, wherein in the fail-safe control, a rotational speed of the internal combustion engine is increased to supply oil to the engagement pressure flow channel by the first pump.

4. The control device for a vehicle drive device according to claim 3, wherein in the fail-safe control, when the internal combustion engine is stopped, the internal combustion engine is allowed to start to supply oil to the engagement pressure flow channel by the first pump.

5. The control device for a vehicle drive device according to claim 4, wherein in the fail-safe control, the drive power source engagement device is brought into an open state and the transmission engagement device is brought into an engaged state, with the internal combustion engine started.

6. The control device for a vehicle drive device according to claim 5, wherein during performance of the fail-safe control, the first pump is driven by the internal combustion engine to bring the drive power source engagement device into an open state and bring the transmission engagement device into an engaged state, and the wheels are driven by the rotating electrical machine.

7. The control device for a vehicle drive device according to claim 1, wherein a determination as to whether a failure in which the flow channel control valve is fixed in the second state has occurred is made based on a control state of a solenoid by a solenoid control circuit or a result of detection by an oil pressure sensor installed on the flow channel control valve, the solenoid switching the flow channel control valve between the first state and the second state, and the solenoid control circuit controlling the solenoid.

8. The control device for a vehicle drive device according to claim 1, wherein when a failure has not occurred in the flow channel control valve and a rotational speed of at least one of the internal combustion engine and the rotating electrical machine is greater than or equal to a set rotational speed having been set, the second pump is stopped.

9. The control device for a vehicle drive device according to claim 8, wherein when the drive power source engagement device is in a slip-engaged state in which an engagement element on an input member side is engaged with an engagement element on a rotating electrical machine side, with a difference in rotational speed present between the engagement elements, the flow channel control valve is controlled to the second state and the second pump is driven.

10. The control device for a vehicle drive device according to claim 2, wherein in the fail-safe control, a rotational speed of the internal combustion engine is increased to supply oil to the engagement pressure flow channel by the first pump.

11. The control device for a vehicle drive device according to claim 10, wherein in the fail-safe control, when the internal combustion engine is stopped, the internal combustion engine is allowed to start to supply oil to the engagement pressure flow channel by the first pump.

12. The control device for a vehicle drive device according to claim 11, wherein in the fail-safe control, the drive power source engagement device is brought into an open state and the transmission engagement device is brought into an engaged state, with the internal combustion engine started.

13. The control device for a vehicle drive device according to claim 12, wherein during performance of the fail-safe control, the first pump is driven by the internal combustion engine to bring the drive power source engagement device into an open state and bring the transmission engagement device into an engaged state, and the wheels are driven by the rotating electrical machine.

14. The control device for a vehicle drive device according to claim 2, wherein a determination as to whether a failure in which the flow channel control valve is fixed in the second state has occurred is made based on a control state of a solenoid by a solenoid control circuit or a result of detection by an oil pressure sensor installed on the flow channel control valve, the solenoid switching the flow channel control valve between the first state and the second state, and the solenoid control circuit controlling the solenoid.

15. The control device for a vehicle drive device according to claim 2, wherein when a failure has not occurred in the flow channel control valve and a rotational speed of at least one of the internal combustion engine and the rotating electrical machine is greater than or equal to a set rotational speed having been set, the second pump is stopped.

16. The control device for a vehicle drive device according to claim 15, wherein when the drive power source engagement device is in a slip-engaged state in which an engagement element on an input member side is engaged with an engagement element on a rotating electrical machine side, with a difference in rotational speed present between the engagement elements, the flow channel control valve is controlled to the second state and the second pump is driven.

17. The control device for a vehicle drive device according to claim 3, wherein a determination as to whether a failure in which the flow channel control valve is fixed in the second state has occurred is made based on a control state of a solenoid by a solenoid control circuit or a result of detection by an oil pressure sensor installed on the flow channel control valve, the solenoid switching the flow channel control valve between the first state and the second state, and the solenoid control circuit controlling the solenoid.

18. The control device for a vehicle drive device according to claim 3, wherein when a failure has not occurred in the flow channel control valve and a rotational speed of at least one of the internal combustion engine and the rotating electrical machine is greater than or equal to a set rotational speed having been set, the second pump is stopped.

19. The control device for a vehicle drive device according to claim 18, wherein when the drive power source engagement device is in a slip-engaged state in which an engagement element on an input member side is engaged with an engagement element on a rotating electrical machine side, with a difference in rotational speed present between the engagement elements, the flow channel control valve is controlled to the second state and the second pump is driven.

20. The control device for a vehicle drive device according to claim 10, wherein a determination as to whether a failure in which the flow channel control valve is fixed in the second state has occurred is made based on a control state of a solenoid by a solenoid control circuit or a result of detection by an oil pressure sensor installed on the flow channel control valve, the solenoid switching the flow channel control valve between the first state and the second state, and the solenoid control circuit controlling the solenoid.

* * * * *